US007885855B2

(12) United States Patent
Kerth et al.

(10) Patent No.: US 7,885,855 B2
(45) Date of Patent: Feb. 8, 2011

(54) COST BASED DYNAMIC PRICING OF GOODS

(75) Inventors: Rainer Kerth, Carmel, NY (US);
Seshashayee Murthy, Yorktown Heights, NY (US); Umeshchandra H. Patel, Santa Clara, CA (US); Meenakshisundaram Venkatasubramaniam, Bridgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 1527 days.

(21) Appl. No.: 11/146,774

(22) Filed: Jun. 6, 2005

(65) Prior Publication Data
US 2006/0277109 A1 Dec. 7, 2006

(51) Int. Cl.
*G06Q 20/00* (2006.01)
*G06F 17/60* (2006.01)
(52) U.S. Cl. .......................................... 705/20; 705/16
(58) Field of Classification Search .............. 705/20–28
See application file for complete search history.

(56) References Cited

U.S. PATENT DOCUMENTS 6,116,099 A * 9/2000 Carl ........................ 73/864.14
6,119,099 A * 9/2000 Walker et al. ................. 705/16
6,298,331 B1 * 10/2001 Walker et al. ................. 705/15
7,184,990 B2 * 2/2007 Walker et al. ............... 705/400
7,249,062 B2 * 7/2007 Norins et al. ................. 705/26
2005/0075935 A1 * 4/2005 Walker et al. ................. 705/16

OTHER PUBLICATIONS

Navneet Bhushan et al., Retail Pro, dated Oct. 24, 2003.*
Retail Pro® dated Oct. 24, 2003; Posted at http://www.retailpro.com1public/public~pfinventory.html/.
Navneet Bhushan, Kishor Gummaraju, "A Petri Net Based Simulation Approach for Evaluating Benefits of Time Temperature Indicator and Wireless Technologies in Perishable Goods Retail Management", *The FOODSIM 2002 Conference*, Jun. 14, 2002.
Taoukis P.S., Bili M. and Giannakourou M, "Application of Shelf Life Modelling of Chilled Salad Products to a Tti Based Distribution and Stock Rotation System", Posted at http://faculty.che.umn.edu/fscn/Ted_Labuza/4131%20Food%20Quality/TaoukisLSFOArticle.pdf.

* cited by examiner

*Primary Examiner*—Matthew S Gart
*Assistant Examiner*—Garcia Ade
(74) *Attorney, Agent, or Firm*—The Brevetto Law Group (57) ABSTRACT

Methods and systems (200) for reducing losses related to perishables are disclosed. The perishables are grouped based on the use-by-date (UBD) and a quantity of at risk perishables are determined (210). A financial impact of the at risk perishables is calculated for each group (220). Pricing is dynamically determined for the perishables based on the financial impact and the UBD (230) and a price display is updated to indicate the pricing of the perishables (240).

17 Claims, 4 Drawing Sheets

COST BASED DYNAMIC PRICING OF GOODS

BACKGROUND

1. Field

The present embodiments relate generally to systems and methods for providing product and inventor management services, and more specifically to systems, methods and services for dynamically pricing goods based on shelf life of the good.

2. Background

Many companies lose profit on wasted inventory due to the time sensitive nature of the goods being produced and/or sold. U.S. consumer goods manufacturers and retailers lose billions of dollars in the supply chain due to failures of life cycle management. It has been estimated by the Food Marketing Institute that over 2 billion USD is lost annually by the U.S. grocery industry on products that are destroyed, returned, placed in salvage or donated to charity.

There are several reasons for perishables obsolescence. For example, at the end of the supply chain, a retail store may receive products with less than their desired shelf life. If the store does not take action in time to move the product quickly to shelf, and/or markdown the product to stimulate sales, then the product can become un-saleable resulting in unnecessary wastage costs.

Present solutions are dependent on manual, untimely and labor-intensive processes, which are mostly ineffective. For example, every year the grocery industry comes up with new initiatives to reduce waste, but without the ability to automate the tracking and recording of the product lifecycle/shelf life, they quickly drop down the priority scale.

Consumer product manufacturers and retailers lack the ability to automatically detect shelf life of high-value perishables and dynamically price items to provide incentive to buyers for buying perishable goods with shorter shelf life, which could reduce losses due to failures in life cycle management.

SUMMARY

Embodiments disclosed herein address the above stated needs by considering the impact of shelf life on the pricing of an item. Accordingly, embodiments of the invention include methods and systems for reducing losses related to perishables. The perishables can be grouped based on the use-by-date (UBD) and a quantity of at risk perishables can be determined. A financial impact of the at risk perishables is calculated for each group. Pricing is dynamically determined for the perishables based on the financial impact and the UBD and a price display is updated to indicate the pricing of the perishables.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Additionally, in the following description the term perishable or perishable good or item is not limited to a specific type of good, such as food items. Those skilled in the art will appreciate that perishable goods can be any time sensitive item, such as circuit components (e.g., based on version), chemicals, pharmaceuticals, organic products, and the like. Accordingly, embodiments of the invention are not limited to food products or retailers, though these examples are used in the following disclosure to illustrate the invention.

As discussed in the foregoing, there are several reasons for perishables obsolescence. Embodiments of the invention reduce the magnitude of the problem at the end of the supply chain, where the store receives products with less than their desired shelf life. For example, if the store does not take action in time to move the product quickly to shelf, or markdown to stimulate sales, then the product can become unfit for sale, resulting in unnecessary wastage costs. However, embodiments of the invention aid in identifying and pricing the perishable goods to stimulate sales and thus reduce or eliminate the product waste.

Embodiments of the invention allow retailers to dynamically price perishables to stimulate sales and provide incentive to buy an item with shorter shelf life at a price lower than regular price vs. the one with longer shelf life at regular price. In one embodiment of the invention, radio frequency identification (RFID) tags are used in conjunction with a real-time dynamic pricing algorithm to facilitate pricing of the perishable goods. When used in conjunction with electronic displays, the customer can view a dynamic price range including low-end pricing if items with shorter shelf life are available.

Perishables with a regular price exceeding can have RFID tags attached (e.g., read-only tags). The retailer may wish to limit the scope to high value goods (e.g., $4 or as determined by the retailer). The retail store inventory system can store the use-by-date (UBD) for each unsold item with a unique electronic product code (EPC). At a predetermined frequency, the minimum and maximum price of perishable items exceeding a certain value (e.g., those with RFID tags attached) can be calculated and updated. The update frequency can be determined by the retail store manager, other designated individual, automatically determined based on industry/product type, automatically determined based on entered criteria, and the like. Once the minimum (Min) and maximum (Max) price of the perishable items are determined, the price range can be updated in a price file, sent to an electronic (e.g., digital) price display at the retail store and/or price-scan kiosks/terminals. When the perishable item is scanned at the point of sale (POS) terminal the customer pays the dynamic price from the price file which can be determined using the logic described below.

The logic modules can receive input for each perishable item at the UPC/GTIN level. For example, the following list of variables can be obtained for a given perishable.

A=Quantity-on-hand grouped by nth use-by-date (UBD) from the retail store inventory system
B=Shortest shelf-life for the item
C=Longest shelf-life for the item
D=Period between longest and shortest shelf-life
E=Average quantity sales per day for the item
F=Retail price per item
G=Cost per item
N=cost of discarding/disposing/returning the item to the supplier From the foregoing list of variables various values can be calculated to aid in the pricing of the perishables. For example, a period between longest and shortest shelf-life can be calculated as:

$$D = C - B. \quad (1)$$

A projection of the quantity of perishables that would have to be discarded if not sold before the use-by-date (UBD) can be calculated as:

$$H_n = A_n - E, \quad (2)$$

If the calculation of $H_n$ in Eq. 2 yields a result greater than zero, then the financial impact on the nth UBD group can be calculated as follows.

$$\text{IF } H_n > 0 \text{ THEN} \quad (3)$$

$$I_n = H_n \times (F - G) \quad (4)$$

$$J_n = H_n \times G \quad (5)$$

$$K_n = H_n \times F \quad (6)$$

$$L_n = (H_n / A_n) \times 100 \quad (7)$$

$$\text{IF } L_n >= Z \text{ THEN} \quad (8)$$

$$M_n = (G - N/2) \quad (9)$$

ELSE $$M_n = (G + (I_n - I_n \times (L_n / 100) / H_n)) \quad (10)$$

ELSE

RETURN.

In the foregoing algorithm $I_n$ is the loss of profit impact, $J_n$ is the cost of perishables if not sold by use-by-date, $K_n$ is the loss of revenue if perishables are not sold by the use-by-date, L is the percentage of quantity unlikely to be sold by the use-by-date (UBD) and Z is a threshold for the percentage of quantity unlikely to be sold by the UBD (e.g., 90). $M_n$ are output values of the price of the perishable item expiring on n use-by-date which are used to determine the Min and the Max price values of the perishable item.

Figure 1:
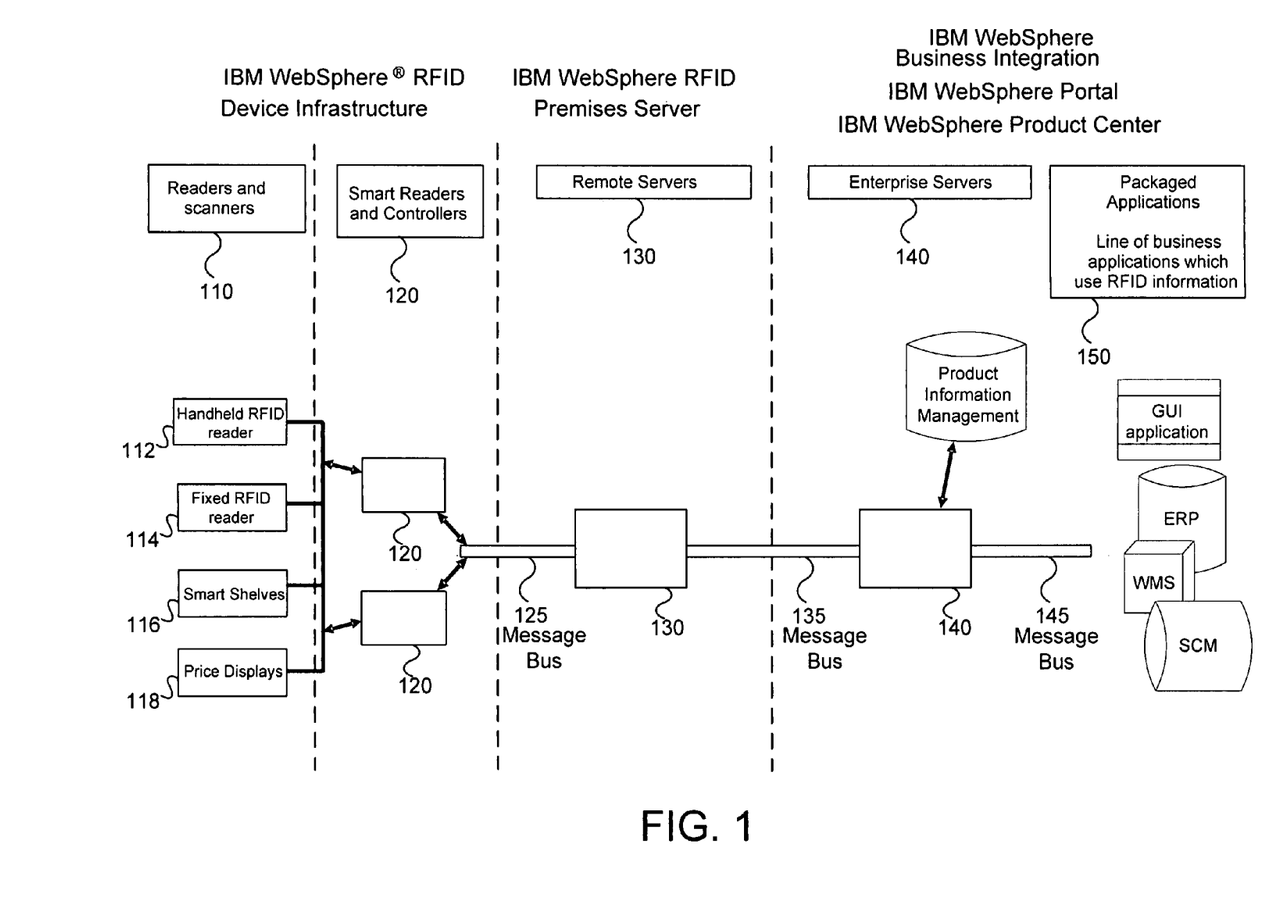
FIG. 1 illustrates a system for implementing various embodiments of the invention.

Referring to FIG. 1, a system level diagram is illustrated showing an exemplary architecture according to at least one embodiment of the invention. For example, product data gathering and display devices 110 can be any data gathering and display devices such as handheld RFID reader 112, fixed RFID reader 114, smart shelves 116 and electronic displays 118. These devices 110 are used to gather information and display information at the retail level. The data gathered by the data gathering devices 110 can be filtered and aggregated at the local level by a controller or smart reader 120. The controller 120 may include infrastructure middleware embedded to integrate RFID data collection and reporting at the edge of the network. For example, the infrastructure middleware may be J2ME (Java-based) open standards with secure messaging capabilities. The controller 120 can then pass the aggregated data via a data link/message bus 125 to a remote server 130. The remote server 130 may be at the retail level or may be at some other remote location. The remote server 130 may include a Java 2 Enterprise Edition (J2EE) Platform to execute RFID enabled business processes and to aggregate and analyze data from RFID devices. The remote server 130 may communicate the data acquired and processed from the RFID devices to an enterprise server 140 via data link 135. The enterprise server 140 may be configured to integrate RFID-enabled business processes with new and legacy line of business applications. The enterprise server 140 may also run or communicate with packaged applications 150. The packaged applications generally refer to business applications which can use RFID information for pricing, inventory management, distribution, and the like. For example, the packaged applications can include Enterprise Resource Planning (ERP), Warehouse Management Software (WMS), and Supply Chain Management (SCM) applications.

Those skilled in the art will appreciate that the infrastructure for implementing embodiments of the invention is commercially available. For example, IBM Websphere® RFID infrastructure devices can be used for data gathering devices 110 and controllers 120. IBM Websphere® RFID premises servers can be used for remote/premises server 130 and IBM Websphere® Business Integration, Websphere® Portal and Websphere® Product Center can be used to implement enterprise server 140 and packaged applications 150. For example, a WebSphere RFID Premises Server can act as a central repository for data coming in from RFID readers and controllers, and can execute business processes using RFID data.

RFID is an emerging technology that can enable real-time connection to information at the very edge of a business, such as retail stores and/or distribution centers, with their enterprise operations. The WebSphere® RFID Premises Server provides an RFID platform that can enable end-to-end processes that can help transform businesses, particularly through enhanced supply chain management and asset management. The Premises Server can run on a Java 2 Enterprise Edition Web-application server, which can provide secure messaging and data filtering, along with management and deployment for remote locations such as retail stores, distribution centers, and manufacturing sites. The Premises Server can interpret and correlate high volumes of data from RFID devices while connecting to the server to other upstream servers such as an enterprise server.

Although specific references have been made to commercially available devices, the invention is not limited to these devices. The reference to specific devices is merely provided for convenience of illustration of the exemplary embodiments of the invention. Further, since many of these commercial devices are well understood to those skilled in the art detailed explanation of each aspect of the illustrated embodiment or alternative configurations will be omitted. Accordingly, those skilled in the art will appreciate that embodiments of the invention are not limited to the illustrated configuration or devices discussed herein.

Figure 2:
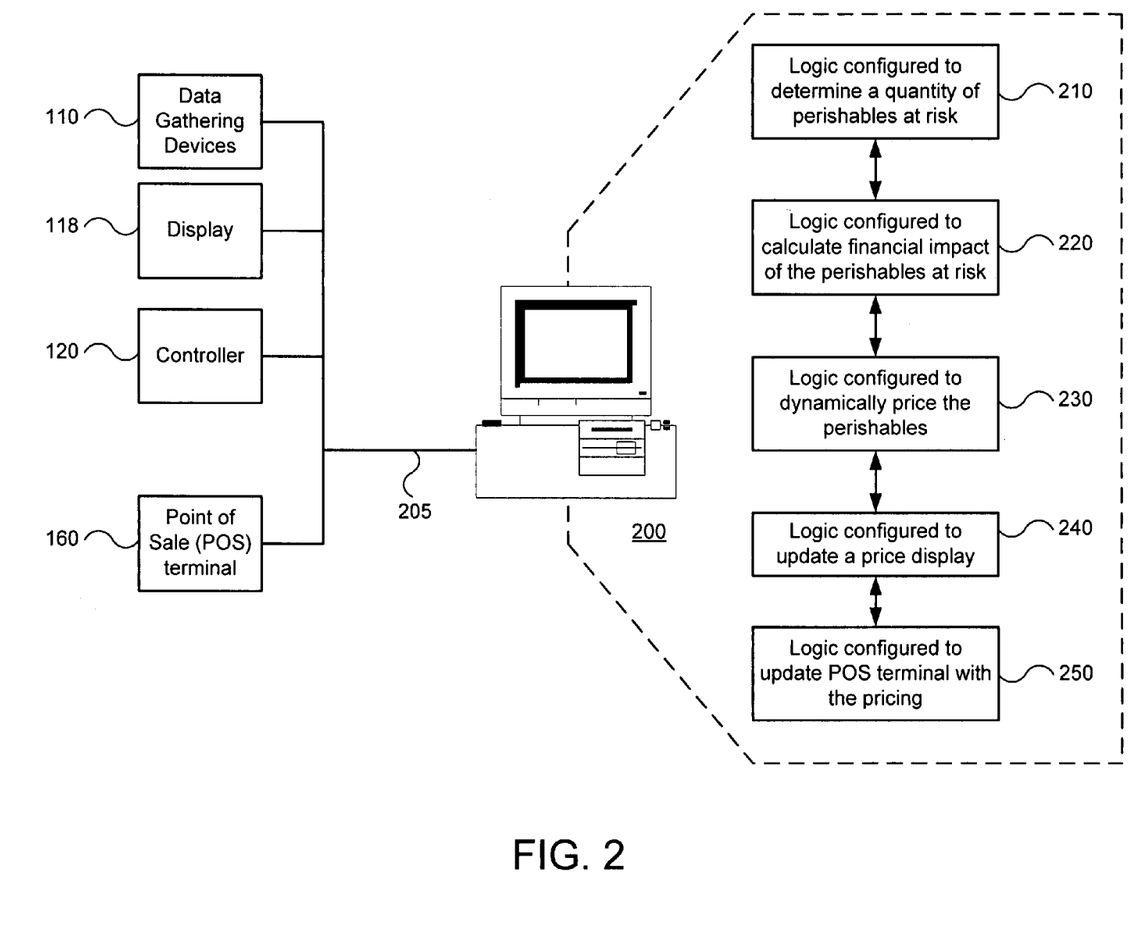
FIG. 2 illustrates logic elements in accordance with at least one embodiment of the invention.

Referring to FIG. 2, a system for reducing losses related to perishables is illustrated. The system can include logic 200 for reducing losses related to perishables including logic 210 configured to determine a quantity of at risk perishables. The at risk perishables are generally determined as the perishables in excess of the average sales for a given UBD, which are grouped based on the UBD, as discussed in the foregoing. That is, for each perishable within a particular type of good (e.g., milk) the inventory is grouped by UBD and then the at risk perishables can be determined (see, e.g., equation 2). Logic 220 is configured to calculate a financial impact of the at risk perishables (e.g., the cost and loss of revenue if the perishables are not sold by the UBD). Logic 230 is configured to dynamically price the perishables based on the financial impact and the UBD. For example, the dynamic pricing can be calculated according to Eqs. 8-10 discussed above. Logic 240 is configured to update a price display to indicate the pricing of the perishables. Logic module 240 of system 200 can be operably coupled to the electronic displays. Further, Logic 250 can be configured to update a point of sale (POS) terminal 160 with the pricing of the perishables.

The system 200 can communicate with elements such as data gathering and display elements 110, controllers 120 and/or POS terminals 160 to obtain data on the perishables and update pricing information at the retail level. The system 200 and various logic modules (210-250) can communicate via communication link 205 to the various elements in the overall system. For example, the RFID data gathering device(s) 110 can be operably coupled to the logic for reducing losses related to perishables. The RFID data gathering device can be at least one of a handheld RFID reader, a fixed RFID reader, and a shelf unit having an integrated RFID reader. Further, a controller 120 operably coupled between or in parallel to the RFID data gathering device 110 and the logic for reducing losses related to perishables 200. Additionally, the price display 118 can be an electronic display that is configured to display a range of pricing (e.g., minimum and maximum pricing for the perishables available). Thus, a consumer can be notified of a range of pricing available for each group of goods and will be encouraged to purchase the lower cost (e.g., at risk) perishable, thereby reducing the losses for the retail store. The actual pricing for each group based on UBD can be dynamically calculated as discussed in the foregoing and the new pricing can be pushed to the POS terminals or kiosks so that the correct price will be charged to the consumer. Likewise, using the RFID tag and readers or other conventional (e.g. bar code scanners) to identify the product purchased can allow for automatic update of the inventory on hand and recalculation of the pricing if desired.

In addition to the elements illustrated in FIG. 2, the system can further include a server (e.g. remote/premises server) and an enterprise server in communication with the premises server, such as illustrated in FIG. 1. The logic 200 for reducing losses related to perishables can be located on at least one of the premises server and the enterprise server. For example, the logic 200 could be entirely contained on one or both servers. Alternatively, the logic 200 can be distributed over one or more servers, other suitable processing devices or can be independent elements, as will be appreciated by those skilled in the art. Generally, the various logic modules 210-250 can be located in any server or suitable device and can be configured in any configuration so long as the functionality of the elements are achieve. For example, logic modules 210-250 could be integrated into one software program or could be distributed as separate modules on several servers. Accordingly, the invention is not limited to the configurations illustrated in the accompanying drawings or discussed herein. In addition to logic 200, additional applications/software can be located on the remote and/or enterprise servers. The applications can be configured to perform various functions, such as enterprise resource planning, warehouse management, and supply chain management. Each application can communicate with the logic 200 for reducing losses related to perishables and utilize common data from the RFID devices.

Further, each logic module (e.g., 210-250) can include additional logic. For example, logic 210 can included logic configured to receive information from a group of perishables affixed with radio frequency identification (RFID) tags scanned using the RFID data gathering devices 110 to obtain a UBD for each perishable. Logic configured to group perishables by UBD and logic configured to calculate the quantity at risk (e.g., using Eq. 2) can also be included. Also, logic 220 can include logic to perform the algorithm of Eqs. 3-7 and logic 230 can include logic to perform the algorithm of Eqs. 8-10. Those skilled in the art will appreciate that each illustrated logic module (210-250) can have various layers of logic to accomplish the functions/sequence of actions disclosed herein. Accordingly, the invention is not limited to the arrangements or logic modules illustrated in the accompanying drawings.

Figure 3:
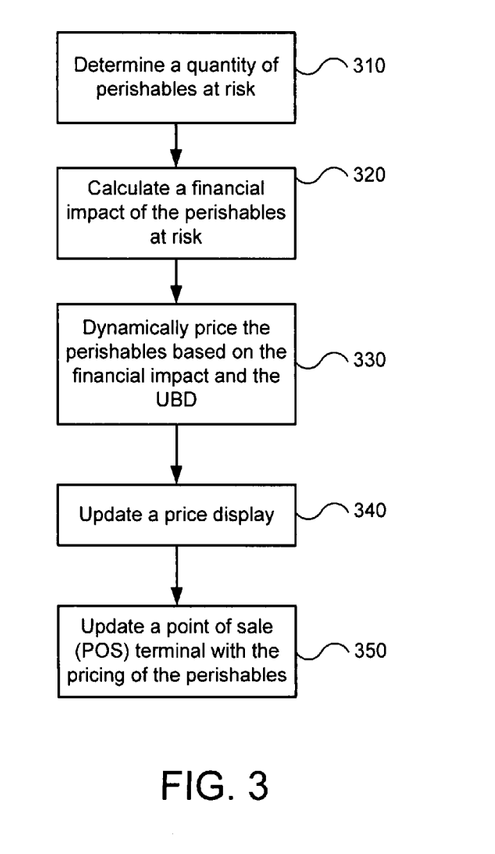
FIGS. 3-6 are flowcharts illustrating methods in accordance with at least one embodiment of the invention.

Further, embodiments of the invention include methods and methods of providing services to a customer (e.g., over a network and/or to manage computer resources) for performing the processes, activities, functions, steps and/or sequence of actions discussed herein. For example, referring to FIG. 3, a method of reducing losses related to perishables is illustrated. A quantity of at risk perishables is determined, block 310. The perishables can be grouped based on the use-by-date (UBD) and the at risk perishables can be determined as discussed in the foregoing. A financial impact of the at risk perishables is calculated, block 320. The perishables are dynamically priced based on the financial impact and the UBD, block 330 and a price display can be updated to indicate the pricing of the perishables, block 340. The method can further include updating a point of sale (POS) terminal with the pricing of the perishables, block 350.

Figure 4:
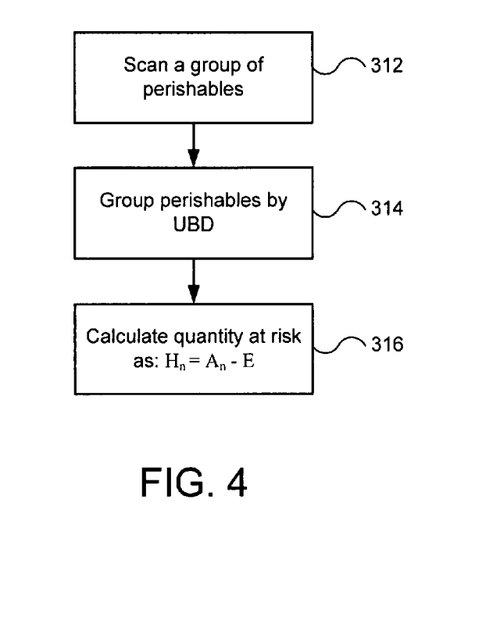
Figure 5:
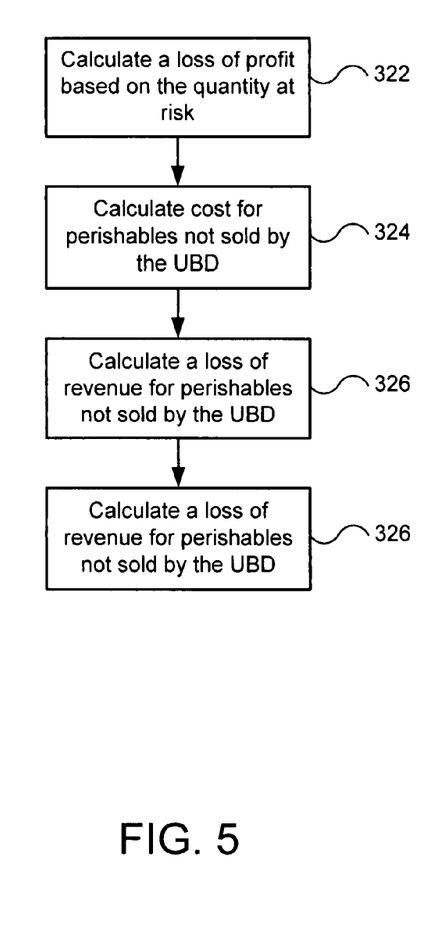

Embodiments of the invention can include further methods and sub-methods as discussed herein. For example, block 310 determining the quantity of at risk perishables can include additional processes such as illustrated in FIG. 4. Referring to FIG. 4, a group of perishables affixed with radio frequency identification (RFID) tags can be scanned using a RFID reader to obtain UBD for each perishable, block 312. The perishables can be grouped by UBD, block and the quantity at risk can be calculated using Eq. 1, for example. Likewise other blocks of the method illustrated in FIG. 3 can include additional sub-process as described herein. For example, referring to FIG. 5, calculating the financial impact in block 320 can include calculating a loss of profit based on the quantity at risk, a retail price per perishable and a cost per perishable, block 322. A cost for perishables not sold by the UBD can be calculated, block 324. A loss of revenue for perishables not sold by the UBD can be calculated, block 326.

Figure 6:
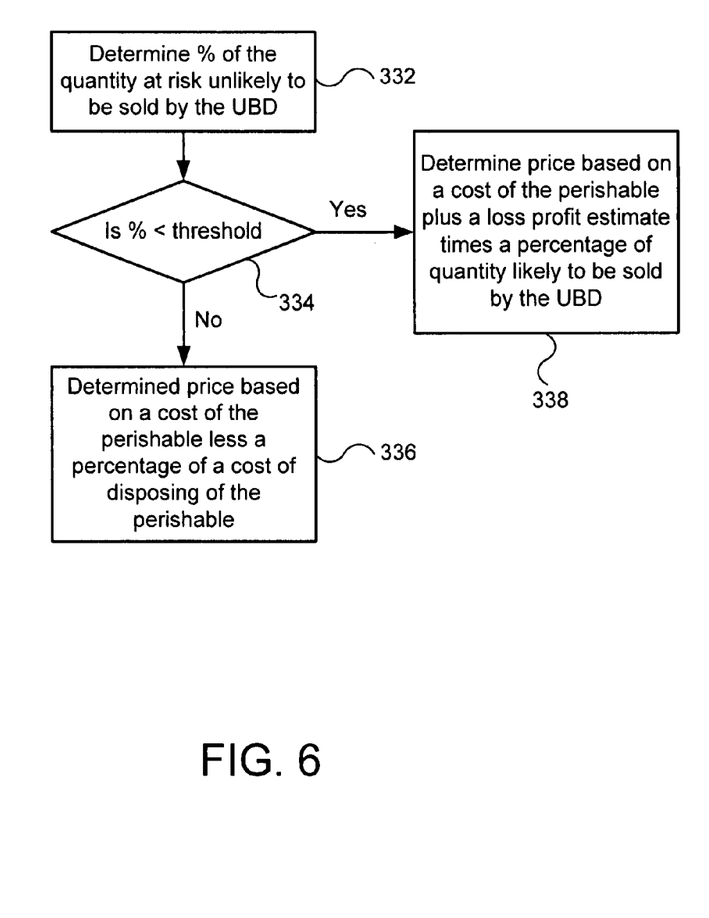

Block 330 dynamically pricing the perishables can include additional processes. For example, referring to FIG. 6, an estimated percentage of the quantity at risk unlikely to be sold by the UBD can be determined, block 332. The estimated percentage can be compared to a threshold value, block 334. The threshold value can be set to any value desired (e.g., 1% to 99%). If the estimated percentage is equal to or exceeds the threshold value, the price of the perishable can be determined based on a cost of the perishable less a percentage (e.g., 10% to 100%) of a cost of disposing of the perishable, block 336. If the estimated percentage is less than the threshold value, the price of the perishable can be determined based on a cost of the perishable plus a loss profit estimate times a percentage of quantity likely to be sold by the UBD, block 338.

Those of ordinary skill in the art understand that data, information and signals may be represented in a number of different ways, using various technologies and techniques. The logical blocks in the flow charts, circuits, and components described in connection with the various embodiments may be implemented as hardware, software, firmware, or some combination thereof. Those of ordinary skill in the art would know to implement the described embodiments using various design options, depending upon the particular constraints and considerations of the situation. Such design choices are not a departure from the scope of the present invention.

The various logical blocks depicted in the flow charts, circuits, and components may be implemented using a personal computer, a microprocessor, a controller, a digital signal processor (DSP), an application specific integrated circuit (ASIC), using discrete or integrated circuitry, or a combination of these. A general purpose processor may be a microprocessor, but in the alternative, the processor may be any conventional processor, microcontroller, or state machine.

The method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a DVD/CD, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Accordingly, an embodiment of the invention can include a computer readable media embodying a method for reducing losses related to perishables comprising: determining a quantity of at risk perishables, wherein the perishables are grouped based on the use-by-date (UBD); calculating a financial impact of the at risk perishables; dynamically pricing the perishables based on the financial impact and the UBD; and updating a price display to indicate the pricing of the perishables. The computer readable media can embody additional methods disclosed herein, such as updating a point of sale (POS) terminal with the pricing of the perishables, and other methods disclosed in the foregoing description.

The various steps and activities in the embodiments described herein may be performed in the exemplary order illustrated in the figures, or another order, depending upon the particularities of the implementation. Various other activities and steps may be performed in a sequence other than that illustrated in the figures.

The disclosure of the various embodiments is provided so as to enable those of ordinary skill in the art to make and use the present invention. Design choices and modifications to the various embodiments will occur to practitioners of ordinary skill in the art without departing from the spirit or scope of the invention. The present invention is not intended to be limited only to those specific versions which are discussed herein for the sake of illustration, but is to be accorded the widest scope for the features and aspects of the invention enabled herein and recited in the appended claims.

What is claimed is:

1. A method of reducing losses related to perishable goods comprising:

determining a quantity of at risk perishables among said perishable goods, wherein the at risk perishables are grouped based on a use-by-date (UBD);

calculating a financial impact of the at risk perishables using a processor executing instructions, wherein said financial impact considers a cost of the perishable goods less a percentage of a cost of disposing of the at risk perishables, said cost of disposing of the at risk perishables being either a cost to discard the at risk perishables or a cost to return the at risk perishables back to a supplier;

storing said financial impact on a nontransitory computer readable media;

dynamically pricing the at risk perishables based on the financial impact and the UBD; and updating a price display to indicate the pricing of the at risk perishables;

wherein the dynamically pricing the at risk perishables comprises performing the following algorithm:

$$L_n = (H_n/A_n) \times 100$$

IF $L_n \geq Z$ THEN $$M_n \geq (G-N/2)$$

where $L_n$ is a percentage of quantity unlikely to be sold by the UBD, and n represents an $n^{th}$ group of the at risk perishables based on the UBD, $A_n$ is a quantity on hand grouped by $n^{th}$ UBD, N is a cost of disposing of the at risk perishables, Z is a threshold for the percentage of quantity unlikely to be sold by the UBD, G is a cost per perishable good, and $M_n$ is a minimum of an output price for the $n^{th}$ group of the at risk perishables based on the UBD.

2. The method of claim 1, further comprising:

updating a point of sale (POS) terminal with the pricing of the at risk perishables.

3. The method of claim 1, wherein the determining the quantity of the at risk perishables comprises:

scanning a group of the perishable goods affixed with radio frequency identification (RFID) tags using a RFID reader to obtain the UBD for each of the perishable goods;

grouping the perishable goods by the UBD;

calculating the quantity of the at risk perishables as:

$$H_n = A_n - E,$$

where $H_n$ is a quantity the of the at risk perishables that would have to be discarded if not sold by the UBD, and E is an average quantity of sales per day for the perishable goods.

4. The method of claim 1, wherein calculating the financial impact comprises:
   calculating a loss of profit based on the quantity at risk, a retail price per each of the perishable goods and the cost per each of the perishable goods;
   calculating a cost for the at risk perishables not sold by the UBD; and
   calculating a loss of revenue for the at risk perishables not sold by the UBD.

5. The method of claim 1, wherein calculating the financial impact comprises:
   performing algorithms as follows:

$I_n = H_n \times (F-G)$ $J_n = H_n \times G$ $K_n = H_n \times F$ where F is a retail price of each of the perishable goods, $H_n$ is a quantity of the at risk perishables that would have to be discarded if not sold by the UBD, $I_n$ is a loss of profit impact, $J_n$ is a cost of the at risk perishables if not sold by the UBD, and $K_n$ is a loss of revenue if the at risk perishables are not sold by the UBD.

6. The method of claim 1, wherein the dynamically pricing of the at risk perishables comprises:
   determining an estimated percentage of the quantity of the at risk perishables unlikely to be sold by the UBD; and
   determining the price of the at risk perishables based on the cost of the perishable goods less a percentage of a cost of disposing of the at risk perishables, wherein the percentage of a cost of disposing of the at risk perishables can range from 10% to 100%.

7. The method of claim 6, wherein the dynamically pricing of the at risk perishables further comprises:
   determining the price of the at risk perishables based on a cost of the perishable goods plus a loss profit estimate times a percentage of quantity likely to be sold by the UBD, if the estimated percentage is less than a threshold value.

8. The method of claim 1, wherein the perishable goods are at least one of food products, chemicals, pharmaceuticals, electronic components, and manufactured items.

9. A system comprising logic for reducing losses related to perishable goods, logic comprising:
   logic configured to determine a quantity of at risk perishables among said perishable goods, wherein the at risk perishables are grouped based on a use-by-date (UBD);
   logic configured to calculate a financial impact of the at risk perishables, wherein said financial impact considers a cost of the perishable goods less a percentage of a cost of disposing of the at risk perishables, said cost of disposing of the at risk perishables being either a cost to discard the at risk perishables or a cost to return the at risk perishables back to a supplier;
   logic configured to dynamically price the at risk perishables based on the financial impact and the UBD; and
   logic configured to update a price display to indicate the pricing of the at risk perishables;
   wherein said logic configured to dynamically price the at risk perishables performs the following algorithm:

$L_n = (H_n/A_n) \times 100$,

IF $L_n >= Z$ THEN $M_n >= (G-N/2)$ where $L_n$ is a percentage of quantity unlikely to be sold by the UBD, and n represents an $n^{th}$ group of the at risk perishables based on UBD, $A_n$ is a quantity on hand grouped by $n^{th}$ UBD, N is a cost of disposing of the perishable, Z is a threshold for the percentage of quantity unlikely to be sold by the UBD, G is a cost per perishable good, and $M_n$ is a minimum of an output price for the $n^{th}$ group of the at risk perishables based on the UBD.

10. The system of claim 9, further comprising:
    logic configured to update a point of sale (POS) terminal with the pricing of the at risk perishables.

11. The system of claim 9, further comprising:
    a radio frequency identification (RFID) data gathering device operably coupled to the logic for reducing losses related to the perishable goods.

12. The system of claim 11, wherein the RFID data gathering device is at least one of a handheld RFID reader, a fixed RFID reader, and a shelf unit having an integrated RFID reader.

13. The system of claim 11 further comprising:
    a controller operably coupled between the RFID data gathering device and the logic for reducing losses related to the perishable goods.

14. The system of claim 9, wherein the logic configured to determining the quantity of at risk perishables comprises:
    logic configured receive information from a group of the perishables affixed with radio frequency identification (RFID) tags scanned using the RFID data gathering device to obtain the UBD for each perishable;
    logic configured to group the perishable goods by the UBD;
    logic configured to calculate the quantity of the at risk perishables as:

$H_n = A_n - E$, where $H_n$ is a quantity of the at risk perishables that would have to be discarded if not sold by the UBD, and E is an average quantity of sales per day for the perishables.

15. The system of claim 9, further comprising:
    a remote server; and
    an enterprise server in communication with the remote server, wherein the logic for reducing losses related to the perishable goods is located on at least one of the remote server and the enterprise server.

16. A nontransitory computer readable media embodying a method of reducing losses related to perishable goods, the method comprising:
    determining a quantity of at risk perishables among said perishable goods, wherein the at risk perishables are grouped based on a use-by-date (UBD);
    calculating a financial impact of the at risk perishables, wherein said financial impact considers a cost of the perishable goods less a percentage of a cost of disposing of the at risk perishables, said cost of disposing of the at risk perishables being either a cost to discard the at risk perishables or a cost to return the at risk perishables back to a supplier;
    dynamically pricing the at risk perishables based on the financial impact and the UBD; and
    updating a price display to indicate the pricing of the at risk perishables;
    wherein the dynamically pricing the at risk perishables comprises performing the following algorithm:

$L_n = (H_n/A_n) \times 100$,

IF $L_n >= Z$ THEN $$M_n \geq (G - N/2)$$

where $L_n$ is a percentage of quantity unlikely to be sold by the UBD, and n represents an $n^{th}$ group of the at risk perishables based on the UBD, $A_n$ is a quantity on hand grouped by $n^{th}$ UBD, N is a cost of disposing of the at risk perishables, Z is a threshold for the percentage of quantity unlikely to be sold by the UBD, G is a cost per perishable good, and $M_n$ is a minimum of an output price for the $n^{th}$ group of the at risk perishables based on the UBD.

17. The nontransitory computer readable media of claim 16, further comprising: updating a point of sale (POS) terminal with the pricing of the at risk perishables.

* * * * *